United States Patent
Petrich et al.

(10) Patent No.: US 9,152,987 B1
(45) Date of Patent: Oct. 6, 2015

(54) SURFACING LOCAL INVENTORY

(75) Inventors: Nicole Petrich, Seattle, WA (US); Ian D. Clarkson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 985 days.

(21) Appl. No.: 12/570,806

(22) Filed: Sep. 30, 2009

(51) Int. Cl.
  G06Q 30/00 (2012.01)
  G06F 17/30 (2006.01)
  G06Q 30/06 (2012.01)

(52) U.S. Cl.
  CPC .................................. *G06Q 30/0601* (2013.01)

(58) Field of Classification Search
  USPC .......................................................... 705/26
  See application file for complete search history.

(56) References Cited

U.S. PATENT DOCUMENTS

| | | | | |
|---|---|---|---|---|
| 7,257,552 B1* | 8/2007 | Franco | ............................ | 705/28 |
| 7,668,761 B2* | 2/2010 | Jenkins et al. | .................. | 705/28 |
| 7,725,366 B1* | 5/2010 | Franco | ........................ | 705/27.1 |
| 7,747,543 B1* | 6/2010 | Braumoeller et al. | ........ | 705/330 |
| 2002/0082954 A1* | 6/2002 | Dunston | ......................... | 705/28 |
| 2002/0133387 A1* | 9/2002 | Wilson et al. | ..................... | 705/8 |
| 2003/0046173 A1* | 3/2003 | Benjier et al. | .................. | 705/26 |
| 2005/0015288 A1* | 1/2005 | Reeves et al. | ..................... | 705/8 |
| 2005/0137935 A1* | 6/2005 | Lee | .................................. | 705/15 |
| 2006/0111845 A1* | 5/2006 | Forbis et al. | ..................... | 702/19 |
| 2006/0265286 A1* | 11/2006 | Evangelist et al. | ............. | 705/22 |
| 2008/0010173 A1* | 1/2008 | Rendich et al. | .................. | 705/28 |
| 2008/0033839 A1* | 2/2008 | Tarvydas et al. | ................ | 705/27 |
| 2008/0208897 A1* | 8/2008 | Lew et al. | ................. | 707/103 R |
| 2008/0223928 A1* | 9/2008 | Wagner et al. | ................ | 235/383 |
| 2008/0294536 A1* | 11/2008 | Taylor et al. | ..................... | 705/28 |
| 2008/0313060 A1* | 12/2008 | Damodaran | .................... | 705/28 |
| 2009/0150262 A1* | 6/2009 | Mizhen | .......................... | 705/27 |
| 2009/0281857 A1* | 11/2009 | Amling et al. | ..................... | 705/7 |

OTHER PUBLICATIONS

Pye, D. (May 1, 2000). The national dream: What's the secret to successful e-commerce? think big, build relationships and never stop adding value. Profit, 19, 42-46. Retrieved from http://search.proquest.com/docview/219255149?accountid=14753.*

* cited by examiner

*Primary Examiner* — Kathleen Palavecino
(74) *Attorney, Agent, or Firm* — Thomas | Horstemeyer, LLP

(57) ABSTRACT

Disclosed are various embodiments for surfacing local inventory. Data representing a global inventory of items stored in several materials handling facilities is provided in a computing device. A portion of the global inventory that is stored in one or more of the materials handling facilities located within a region is identified. One or more network pages are generated that surface one or more items included in the portion of the global inventory in association with one or more dedicated items stored in the one or more materials handling facilities. The dedicated items are dedicated for delivery within the region.

22 Claims, 3 Drawing Sheets

SURFACING LOCAL INVENTORY

BACKGROUND

Merchants may fulfill orders for items by way of a fulfillment network including one or more fulfillment centers. These fulfillment centers may be geographically distributed to provide more efficient service than would be possible through a centralized location.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
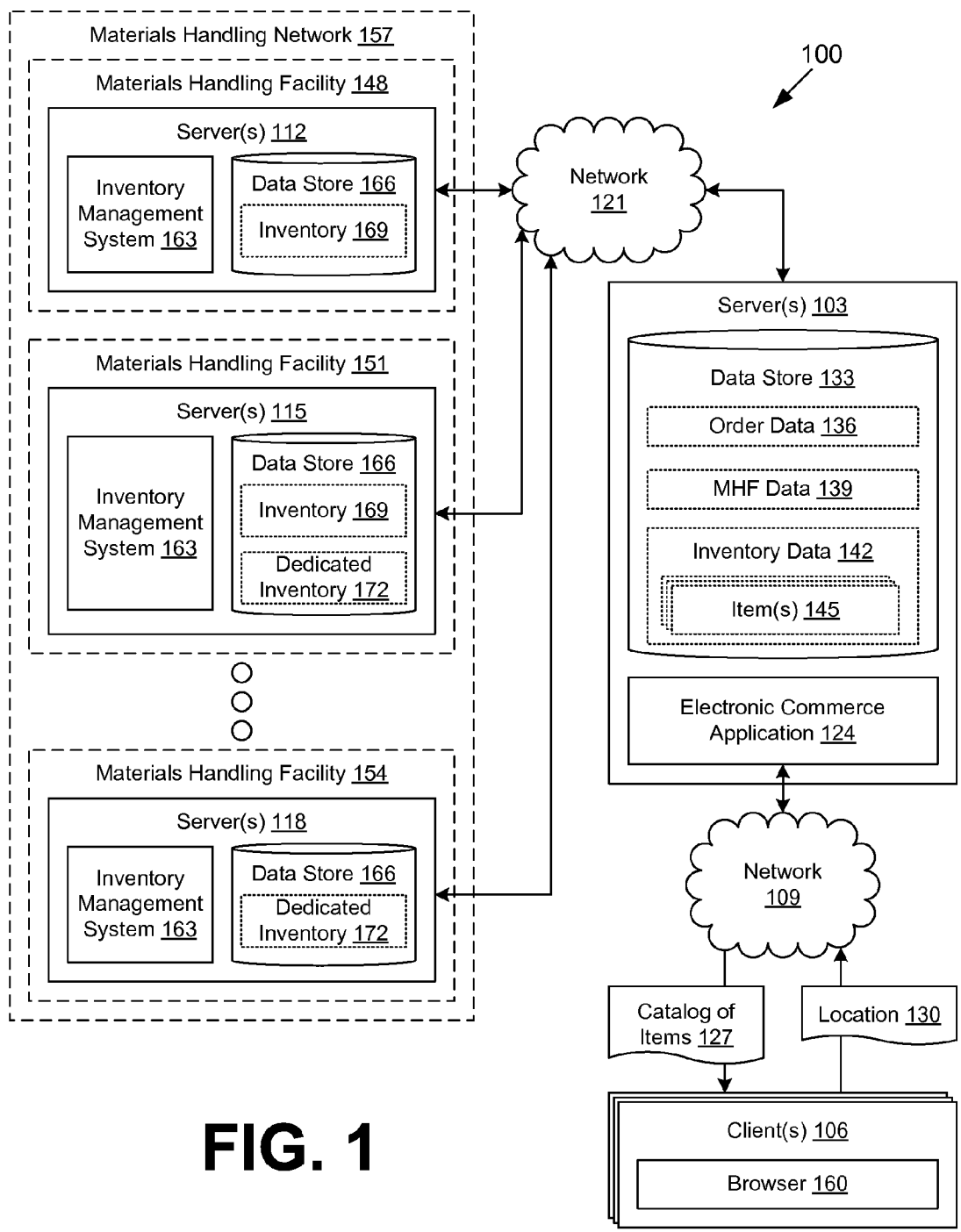
FIG. 1 is a drawing of a networked environment according to various embodiments of the present disclosure.

A merchant may have a fulfillment network with fulfillment centers that are geographically dispersed. Typically, the fulfillment network is designed to fulfill a global inventory of items. As used herein, "items" may refer to products, goods, digital downloads, services, and/or any other item that may be ordered and delivered. Orders are taken from a large geographic area via, for example, the Internet, phone, mail, or some other form of communication.

The orders may then be fulfilled by a fulfillment center that has the ordered items in stock and that is typically nearest the delivery location of the customer. In some cases, such a fulfillment center may be hundreds of miles away. Orders are fulfilled by shipping carriers such as the United States Postal Service®, UPS®, FedEx®, DHL®, and/or other shipping carriers. Although same-day or next-day delivery options may be available from the shipping carriers, same-day or next-day delivery may be prohibitively expensive. Therefore, an ordinary fulfillment network is not well suited for delivery of consumable items, which are items that are used and replenished on a regular basis such as, for example, perishable items.

However, the merchant may augment its fulfillment network to provide delivery of consumable items where practical. For example, a fulfillment center may stock an inventory of items dedicated to the region surrounding the fulfillment center. The fulfillment center may then offer delivery of those items to the region through a local delivery system. As a non-limiting example, a local delivery system may comprise delivery agents and a fleet of vehicles that are used to deliver items via planned routes to customer-specified locations. As another non-limiting example, a local delivery system may comprise a set of fixed locations in the region to which ordered items are delivered, whereby a customer may travel to a designated one of the fixed locations to pick up an order.

As yet another non-limiting example, a local delivery system may comprise a centralized location where customers may pick up orders. Where a merchant has a network site, the merchant may have a separate network site for customers in the served areas to order the dedicated items.

According to embodiments of the present disclosure, a fulfillment center with a local delivery system that maintains dedicated items in stock may also maintain at least a portion of a global inventory of items in stock. In such embodiments, customers may order dedicated items such as, for example, groceries and other consumable and/or perishable items, together with items from the global inventory, and have the order delivered through the local delivery system. Alternatively, a customer may order only an item from global inventory, which may be fulfilled through the fulfillment center with the local delivery system. The present disclosure relates to surfacing local inventory on one or more network pages so that items available for delivery through the local delivery systems are so identified to the customer. In the following discussion, a general description of the system and its components is provided, followed by a discussion of the operation of the same.

With reference to FIG. 1, shown is a networked environment 100 according to various embodiments of the present disclosure. The networked environment 100 includes a server 103 that is in data communication with one or more clients 106 via a network 109 and a plurality of servers 112, 115, 118 via a network 121. The networks 109, 121 may include, for example, the Internet, intranets, extranets, wide area networks (WANs), local area networks (LANs), wired networks, wireless networks, or other suitable networks, etc., or any combination of two or more such networks. In some embodiments, the networks 109, 121 may comprise a single network.

The server 103 may comprise, for example, a computing device or computing resource such as a server computer or any other system providing computing resources. The server 103 may represent multiple computer systems arranged, for example, in one or more server banks or other arrangements. Such servers 103 may be located in a single installation or may be dispersed among many different geographical locations. For purposes of convenience, the server 103 is referred to herein in the singular. However, in one embodiment, the server 103 represents a plurality of servers arranged as described above.

The server 103 is configured to execute various applications such as, for example, an electronic commerce application 124 and other applications. The electronic commerce application 124 is executed to perform functions relating to interfacing with customers to generate network pages including a catalog of items 127 and other data. The electronic commerce application 124 is also executed to receive a location 130, item orders, payment information, contact information, and other customer information relating to orders.

The server 103 includes a data store 133 and potentially other data stores, which may comprise data and applications configured to provide access to the data. The data store 133 may be used to store order data 136, materials handling facility (MHF) data 139, inventory data 142, including data respecting a plurality of items 145, and/or potentially other data. Order data 136 may include a variety of data respecting an order, including items 145 that have been ordered, delivery/shipping information, payment information, gift wrapping and/or other special instructions, customer contact information, and/or other data. MHF data 139 includes information respecting a plurality of materials handling facilities 148, 151, 154 within a materials handling network 157. MHF data 139 may include delivery service area information for each materials handling facility 148, 151, 154 in the materials handling network 157 and/or other data.

Inventory data 142 may include data respecting items 145 that may be available for order in global inventory (or a global pool of items 145) or local inventory (a subset or portion of the global pool of items 145) at a materials handling facility 148, 151, 154 in the materials handling network 157 and/or other data. In particular, information associated with items 145 in the inventory data 142 may include, for example, title, description, price, weight, available quantities in the materials handling network 157, available quantities at each materials handling facility 148, 151, 154, shipping availability, and/or other data.

A client 106 may comprise, for example, a computer system such as a desktop, laptop, or other computer system. The client 106 may also comprise personal digital assistants, cellular telephones, set-top boxes, or other systems with like capability. Further, the client 106 may also comprise any computing device that is network capable that may communicate with the server 103 over the network 109 to perform various functions. Such clients 106 may comprise, for example, processor-based devices having processor circuits comprising a processor and a memory.

The client 106 may be configured to execute various applications such as a browser 160 and/or other applications. The browser 160 may be executed in a client 106, for example, to access and render network pages, such as web pages, or other network content served up by the server 103 and/or other servers. The client 106 may be configured to execute applications beyond browser 160 such as, for example, email applications, instant message applications, and/or other applications.

In particular, the browser 160 is adapted to receive a catalog of items 127 from the server 103 over the network 109. The catalog of items 127 includes information about a plurality of items 145 that may be available for order such as, for example, a description of a first item 145 or a link to another network page regarding a second item 145. The browser 160 is also adapted to provide a location 130 to the server 103. The location 130 may comprise, for example, a delivery address, city, state, postal code, geographic coordinates, and/or some other data that identifies a location 130. In various embodiments, the location 130 details may be currently stored on the server 103, and the location 130 may comprise an identifier that enables the electronic commerce application 124 to associate the client 106 with one or more stored locations.

The materials handling network 157 includes a plurality of materials handling facilities 148, 151, 154. The materials handling facilities 148, 151, 154 may include one or more of, but are not limited to, warehouses, distribution centers, cross-docking facilities, order fulfillment centers (also referred to as fulfillment facilities), packaging facilities, shipping facilities, or other facilities or combination of facilities for performing one or more functions of material (inventory) handling. Although the example of the three materials handling facilities 148, 151, 154 is discussed herein, it is understood that the materials handling network 157 may comprise any number or configuration of materials handling facilities 148, 151, 154. The materials handling facilities 148, 151, 154 included in the materials handling network 157 may be geographically distributed and/or clustered near population centers. The locations of materials handling facilities 148, 151, 154 may be determined based at least in part on factors such as, but not limited to, availability of a shipping hub, distance to population centers, operating expenses, and/or other factors.

Each materials handling facility 148, 151, 154 may be associated with a respective server 112, 115, 118. The servers 112, 115, 118 may comprise, for example, a server computer or any other system providing computing resources. The servers 112, 115, 118 may represent multiple computer systems arranged, for example, in one or more server banks or other arrangements. Such servers 112, 115, 118 may be located in a single installation or may be dispersed among many different geographical locations (for example, in each respective materials handling facility 148, 151, 154). For purposes of convenience, each server 112, 115, 118 is referred to herein in the singular. However, in one embodiment, each server 112, 115, 118 represents a plurality of servers arranged as described above. In another embodiment, the functionality of all servers 112, 115, 118 may be performed through a single logical system, such as server 103.

The servers 112, 115, 118 are configured to execute various applications such as, for example, an inventory management system 163 and other applications. The servers 112, 115, 118 each include a data store 166 and potentially other data stores, which may comprise data and applications configured to provide access to the data. The data store 166 may be used to store data respecting inventory 169, dedicated inventory 172, and/or other data. Inventory 169 represents those items 145 that are part of a global inventory and stocked or stored in the respective materials handling facility 148, 151. Dedicated inventory 172 represents those items 145 that are part of a local inventory and stocked or stored in the respective materials handling facility 151, 154. Inventory 169 and dedicated inventory 172 may include data such as storage locations within the facility, quantities available, and/or other data. Dedicated inventory 172 may additionally include data such as expiration dates for perishable items 145, allowed or restricted delivery zones, and/or other data.

The inventory management system 163 is executed to maintain and update inventory 169 and dedicated inventory 172. In various embodiments, the inventory management system 163 may be used to provide real-time access to the state of the inventory 169 and/or dedicated inventory 172 stored in the respective materials handling facility 148, 151, 154. To this end, the inventory management system 163 may function alongside other systems to receive and process updates regarding the real-time status of the items 145 stocked in the respective materials handling facility 148, 151, 154.

Next, a general description of the operation of the various components of the networked environment 100 is provided. To begin, a user of a client 106 provides a location 130 to the electronic commerce application 124. In various embodiments, the location 130 may be provided at the same time as registering an account or performing some other action through the electronic commerce application 124 or through other systems of the merchant. In other embodiments, the electronic commerce application 124 may be able to determine a location 130 associated with the client 106 based upon a geolocation technology using an identifier associated with the client 106. As a non-limiting example, the electronic commerce application 124 may query a database of Internet Protocol (IP) addresses or address ranges based at least in part on an IP address associated with the client 106. The location 130 is ultimately a place where ordered items 145 are to be delivered which, in some cases, may not correspond to the physical location 130 of the user.

The electronic commerce application 124 generates one or more network pages including a catalog of items 127. Each of the one or more network pages may be generated and/or accessed in response to additional requests from the browser 160. The catalog of items 127 may include a default selection of items 145 such as for a home network page for a network site; a selection of items 145 associated with a particular category based at least in part on attributes such as cost, popularity, type, brand, etc.; a selection of items 145 based at least in part on a search query provided by the client 106; and/or other items 145 determined according to some criteria. If the client 106 is determined to be associated with a location 130 that is within a region served by a material handling facility 151, 154 that stocks dedicated inventory 172, the catalog of items 127 may include one or more items 145 that are in the dedicated inventory 172.

As a non-limiting example, if a client 106 is determined to be associated with a location 130 within a metropolitan area, and the materials handling facility 154 corresponds to a fulfillment warehouse in the metropolitan area that is determined to serve the location 130 via a local delivery system, then the catalog of items 127 may include those items 145 that are in stock at the materials handling facility 154 and available for local delivery to the location 130. In this regard, the electronic commerce application 124 may serve up a network site focused on the ordering of dedicated items 145 from the dedicated inventory 172 within geographic areas that are served by local delivery systems of materials handling facilities 151, 154.

Additionally, the electronic commerce application 124 may be configured to include one or more items 145 in the catalog of items 127 from the global inventory 169 that are stocked in a materials handling facility 148, 151 having a local delivery system that serves the location 130. For example, if a customer is searching for items 145 that are related to the term "peach," the electronic commerce application 124 may generate a catalog of items 127 that offers for order dedicated items 145 from the dedicated inventory 172 including several varieties of fresh peaches, peach muffins, peach cookies, and other relevant dedicated items 145 that may be delivered through a local delivery system to the location 130 of the customer. Along with such dedicated items 145, the electronic commerce application 124 may also include items 145 from global inventory 169 that may also be fulfilled through the local delivery system such as a cookbook titled "Cooking with Peaches." Such items 145 may be embedded within the other dedicated items 145 or highlighted within a side bar or other network page feature.

Any other items 145 from global inventory 169 that may be fulfilled through a local delivery system may also be featured in the catalog of items 127, regardless of relevance to a search query. For example, the catalog of items 127 may include a popular item 145 such as, for example, a best-selling music album for the current week. Such items 145 may be presented alongside other relevant items 145 in order to be considered as possible impulse purchases, being analogous to products sold in supermarket checkout stands.

As another non-limiting example, a customer having a location 130 served by a local delivery system may be searching for a certain book. The book may have several editions that are available in global inventory 169 such as a hardcover first edition, a paperback second edition, a hardcover abridged edition, and so on. The electronic commerce application 124 may determine that the paperback second edition is stocked in a materials handling facility 148 that can provide delivery through a local delivery system to the location 130, while the other edition is stocked in another materials handling facility 148 that is several states away.

Accordingly, the electronic commerce application 124 may surface the local inventory by indicating the special status of the paperback second edition within the generated catalog of items 127 by ranking within the catalog of items 127, accompanying the description of the paperback second edition with a special indicia or descriptive text, excluding the other editions from a first network page including the portion of the catalog of items 127, and/or by other indications. The customer is then able to make an informed decision about which edition of the book to order given that the paperback edition may be available for same-day delivery to the location 130 at a reasonable cost.

When a location 130 is not served by a local delivery system of a materials handling facility 148, 151, 154, the electronic commerce application 124 may be configured to generate a catalog of items 127 comprising only items 145 available in an inventory 169 but not in a dedicated inventory 172. In such a case, the items 145 may be available for delivery by way of a traditional shipping option provided by a shipping carrier. Such a catalog of items 127 may be also generated in the case where a location 130 has not been provided or otherwise identified to the client 106.

In various embodiments, the electronic commerce application 124 may be configured to determine the local inventory stored in each of the materials handling facilities 148, 151, 154 in the materials handling network 157 by querying an inventory management system 163 corresponding to each respective facility over the network 121. The respective inventory management system 163 may confer with the data stored in inventory 169 and/or dedicated inventory 172 to determine the items 145 that are available for fulfillment. In some embodiments, the inventory management system 163 may be configured to provide real-time inventory data 142. Alternatively, the electronic commerce application 124 may be configured to determine from pending orders in the order data 136 which items 145 have been ordered but not yet fulfilled.

In this way, the electronic commerce application 124 may be able to ascertain what inventory 169 and/or dedicated inventory 172 in a given materials handling facility 148, 151, 154 can be discretely allocated to a future order. To this end, the electronic commerce application 124 may cache a snapshot of the local inventories within inventory data 142. Additionally, the electronic commerce application 124 may be configured to reserve tentatively items 145 displayed in a catalog of items 127 for a customer so they are not all ordered by other customers for a time period or while the catalog of items 127 is being rendered by browser 160 to the customer.

In some embodiments, as a non-limiting example, a customer may place an order for a first item 145 in dedicated inventory 172 at a materials handling facility 154 and a second item 145 in inventory 169 at a materials handling facility 148. Both materials handling facilities 148, 154 may offer local delivery to a location 130 associated with the customer. In such a case, the second item 145 may be forwarded to the materials handling facility 154 so that both items 145 are delivered in a single delivery. In various embodiments, the materials handling facilities 148, 151, 154 may have differing systems of accounting and may be associated with different network sites served up by the electronic commerce application 124. Therefore, some embodiments may be configured such that a first network site associated with the first item 145 may purchase the second item 145 from a second network site in a manner that is handled substantially transparently to the customer.

After viewing the catalog of items 127, a customer may decide to order one or more items 145. Through various interactions, the customer places an order through the electronic commerce application 124. As a non-limiting example, a customer may order an item 145 from global inventory 169 that is within a local inventory 169 along with another item 145 from a dedicated inventory 172. Furthermore, the electronic commerce application 124 may be configured to display additional items 145 for order as part of a checkout workflow. In various embodiments, the electronic commerce application 124 may be configured to generate one or more manifests in the applicable materials handling facilities 148, 151, 154 specifying same-day delivery of the order at the delivery location 130 of the customer.

Figure 2:
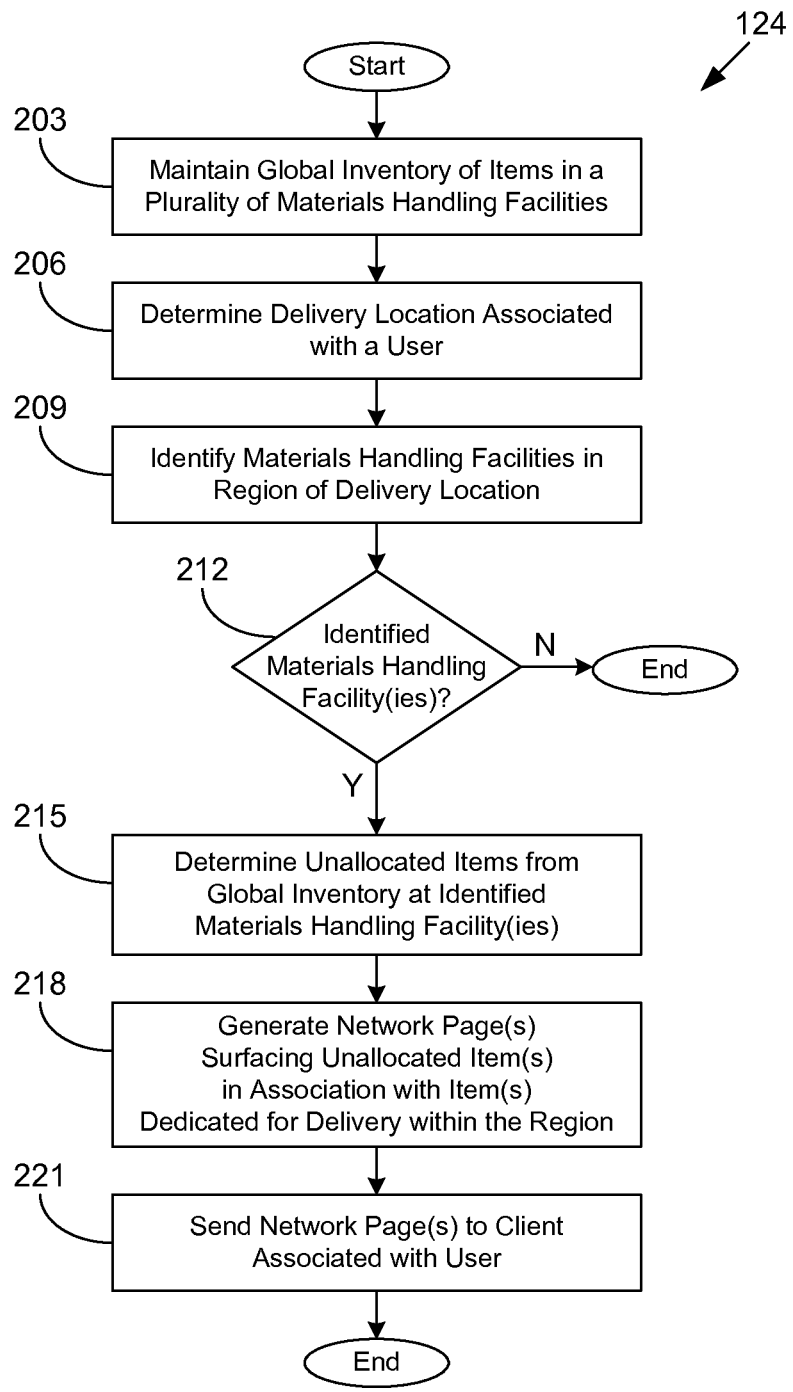
FIG. 2 is a flowchart that illustrates one example of functionality implemented as a portion of an electronic commerce application executed in a server in the networked environment of FIG. 1 according to various embodiments of the present disclosure.

Moving now to FIG. 2, shown is a flowchart that provides one example of the operation of a portion of the electronic commerce application 124 according to various embodiments. It is understood that the flowchart of FIG. 2 provides merely an example of the many different types of functional arrangements that may be employed to implement the operation of the portion of the electronic commerce application 124 as described herein. As an alternative, the flowchart of FIG. 2 may be viewed as depicting an example of steps of a method implemented in the server 103 (FIG. 1) according to one or more embodiments.

Beginning with box 203, the electronic commerce application 124 maintains a global inventory 169 (FIG. 1) of items 145 (FIG. 1) in a plurality of materials handling facilities 148, 151, 154 (FIG. 1). Some of the materials handling facilities 148, 151, 154 may offer local delivery to a region through a local delivery system, while others of the materials handling facilities 148, 151, 154 may offer no such local delivery option. The electronic commerce application 124 may be equipped to track the real-time inventory in each of the materials handling facilities 148, 151, 154 by communicating with the inventory management system 163 (FIG. 1) of the respective materials handling facility 148, 151, 154. In this way, the inventory data 142 (FIG. 1) may be updated and/or synchronized according to inventory 169, dedicated inventory 172 (FIG. 1), and/or other inventory data 142. Additionally, the electronic commerce application 124 may be configured to update the inventory data 142 according to orders that have been received in order data 136 (FIG. 1) to ensure that all of the available local inventory of an item 145 at a particular materials handling facility 148, 151, 154 has not already been discretely allocated to orders.

The electronic commerce application 124 continues to box 206 and determines at least one delivery location 130 (FIG. 1) associated with a user or customer. The location 130 may be provided by the user to the electronic commerce application 124 in the form of an address, postal code, city, state, geographic coordinates, and/or some other form of location. The user may instead provide an identifier to the electronic commerce application 124, thereby permitting the electronic commerce application 124 to ascertain the location 130 from stored data.

In box 209, the electronic commerce application 124 identifies materials handling facilities 148, 151, 154 in a region including the delivery location 130. In particular, the electronic commerce application 124 may consult the MHF data 139 (FIG. 1) to determine the regions served by the materials handling facilities 148, 151, 154. Such regions may be expressed, for example, as a list of addresses, a listing of postal codes, a geographic area, a city or cities, a county or counties, a state or states, etc. The electronic commerce application 124 compares the regions associated with the materials handling facilities 148, 151, 154 to determine matches for the location 130, i.e., where the location 130 is within one or more of the served regions.

The electronic commerce application 124 then determines in box 212 whether any such materials handling facilities 148, 151, 154 have been identified. If no materials handling facilities 148, 151, 154 have been identified, then the electronic commerce application 124 ends. Otherwise, if one or more materials handling facilities 148, 151, 154 have been identified, the electronic commerce application 124 proceeds to box 215.

In box 215, the electronic commerce application 124 determines unallocated items 145 from global inventory 169 at the identified materials handling facilities 148, 151, 154. The unallocated items 145 are items 145 that have not been discretely allocated to an order. In various embodiments, the electronic commerce application 124 may determine the unallocated items 145 by consulting an inventory management system 163 or by examining pending customer orders in order data 136 and/or other data.

Next, in box 218, the electronic commerce application 124 generates one or more network pages surfacing at least one of the unallocated items 145 from global inventory 169 in association with one or more items 145 that are dedicated for delivery within the regions including the location 130. In other words, the unallocated items 145 from global inventory 169 are surfaced in conjunction with items 145 from dedicated inventory 172 stored in one of the identified materials handling facilities 151, 154. Both sets of items 145 are stored in local inventory at one or more of the identified materials handling facilities 148, 151, 154 and available for delivery through a local delivery system. The items 145 that are surfaced as a catalog of items 127 (FIG. 1) may be manually preselected, randomly selected, selected according to a user-provided search query, and/or selected by some other function.

Finally, in box 221, the electronic commerce application 124 sends the one or more generated network pages to the client 106 (FIG. 1) associated with the user or customer. The electronic commerce application 124 then ends.

Figure 3:
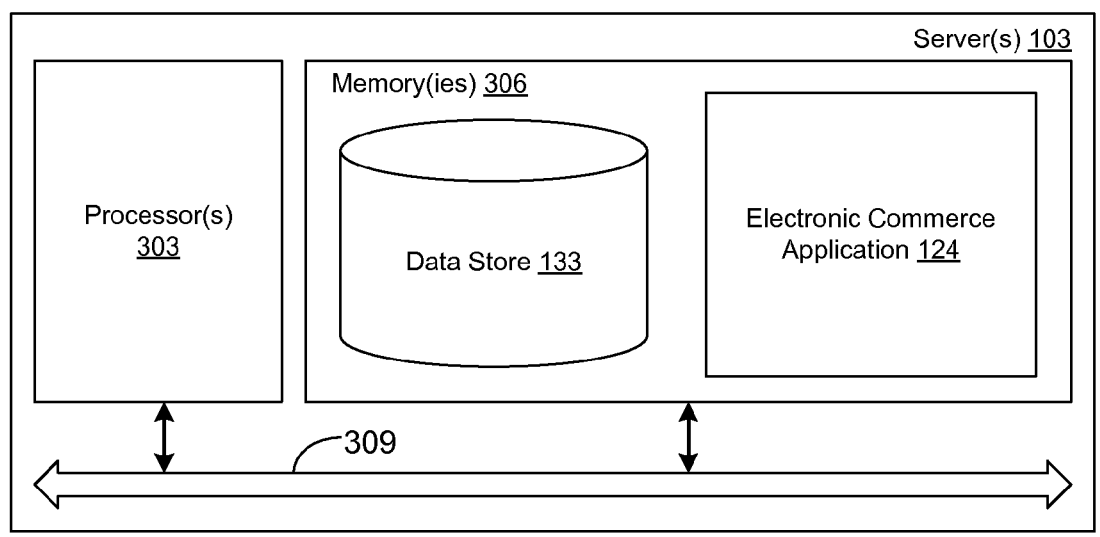
FIG. 3 is a schematic block diagram that provides one example illustration of a server employed in the networked environment of FIG. 1 according to various embodiments of the present disclosure.

Referring next to FIG. 3, shown is a schematic block diagram of the server 103 according to an embodiment of the present disclosure. The server 103 includes a processor circuit, for example, having a processor 303 and a memory 306, both of which are coupled to a local interface 309. To this end, the server 103 may comprise, for example, a server computer or like device or any other form of computing resource including a processor circuit. The local interface 309 may comprise, for example, a data bus with an accompanying address/control bus or other bus structure as can be appreciated.

Stored in the memory 306 are both data and several components that are executable by the processor 303. In particular, stored in the memory 306 and executable by the processor 303 are an electronic commerce application 124 (FIG. 1) and potentially other applications. Also stored in the memory 306 may be a data store 133 (FIG. 1) and other data. In addition, an operating system may be stored in the memory 306 and executable by the processor 303.

It is understood that there may be other applications that are stored in the memory 306 and are executable by the processors 303 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 306 and are executable by the processor 303. In this respect, the term "executable" means a program file that is in a form that can ultimately be run by the processor 303. Examples of executable programs may be, for example, a compiled program that can be translated into machine code in a format that can be loaded into a random access portion of the memory 306 and run by the processor 303, source code that may be expressed in proper format such as object code that is capable of being loaded into a random access portion of the memory 306 and executed by the processor 303, or source code that may be interpreted by another executable program to generate instructions in a random access portion of the memory 306 to be executed by the processor 303, etc. An executable program may be stored in any portion or component of the memory 306 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 306 is defined herein as including both volatile and nonvolatile memory and data storage components. Volatile components are those that do not retain data values upon loss of power. Nonvolatile components are those that retain data upon a loss of power. Thus, the memory 306 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 303 may represent multiple processors 303 and the memory 306 may represent multiple memories 306 that operate in parallel processing circuits, respectively. In such a case, the local interface 309 may be an appropriate network 109 (FIG. 1) that facilitates communication between any two of the multiple processors 303, between any processor 303 and any of the memories 306, or between any two of the memories 306, etc. The local interface 309 may comprise additional systems designed to coordinate this communication, including, for example, performing load balancing. The processor 303 may be of electrical or of some other available construction.

Although the electronic commerce application 124 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 2 shows the functionality and operation of an implementation of portions of the electronic commerce application 124. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart of FIG. 2 shows a specific order of execution, it is understood that the order of execution may differ from that which is depicted. For example, the order of execution of two or more blocks may be scrambled relative to the order shown. Also, two or more blocks shown in succession in FIG. 2 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 124, that comprises software or code can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A computer-implemented method comprising:
providing, in at least one computing device, inventory data representing a global inventory of products stored in a plurality of fulfillment centers, the inventory data including at least one of: an expiration date for a particular perishable product, an allowed delivery zone for the particular perishable product, or a restricted delivery zone for the particular perishable product;

determining, in the at least one computing device, a delivery location associated with a customer corresponding to a client, wherein the delivery location is determined based at least in part on a geolocation technology using an identifier associated with the client, or the delivery location is determined based at least in part on a user-specified location received from the client;

determining, in the at least one computing device, a region which includes the delivery location;

identifying, in the at least one computing device, at least one of the plurality of fulfillment centers located within the region, wherein at least another one of the plurality of fulfillment centers is located in a different region;

identifying from the inventory data, in the at least one computing device, a portion of the global inventory that is stored in the at least one of the plurality of fulfillment centers, the portion of the global inventory being unallocated to other customers;

generating, in the at least one computing device, at least one network page that surfaces at least one product included in the portion of the global inventory that is unallocated to the other customers in association with at least one perishable product stored in the at least one of the plurality of fulfillment centers, the at least one perishable product being dedicated for delivery within the region, wherein at least one product surfaced in the at least one network page is unspecified in a request by the customer for the at least one network page;

sending the at least one network page to the client corresponding to the customer; and wherein the portion of the global inventory that is stored in the at least one of the plurality of fulfillment centers located within the region and is unallocated to other customers is available for delivery to the different region, and the at least one perishable product is unavailable for delivery to the different region.

2. The computer-implemented method of claim 1, further comprising:

obtaining, from the client, an order for the at least one product and the at least one perishable product; and generating, in the at least one computing system, a manifest in the at least one of the plurality of fulfillment centers specifying same-day delivery of the order at the delivery location.

3. The computer-implemented method of claim 1, wherein the at least one network page includes a description of the at least one perishable product and a link to another network page that describes the at least one product.

4. A computer-implemented method, comprising:

providing, in at least one computing device, inventory data representing a global inventory of items stored in a plurality of materials handling facilities;

determining, in the at least one computing device, a region corresponding to a client, wherein at least one of the plurality of materials handling facilities is located within the region and at least another one of the plurality of materials handling facilities is located within a different region, the region being determined based at least in part on a geolocation technology using an identifier associated with the client, or the region being determined based at least in part on a user-specified location associated with the client;

identifying from the inventory data, in the at least one computing device, a portion of the global inventory that is stored in the at least one of the plurality of materials handling facilities located within the region;

generating, in the at least one computing device, at least one network page that surfaces at least one item included in the portion of the global inventory stored in the at least one of the plurality of materials handling facilities within the region in association with at least one dedicated item stored in the at least one of the plurality of materials handling facilities within the region, the at least one dedicated item being dedicated for delivery within the region; and wherein the portion of the global inventory stored in the at least one of the plurality of materials handling facilities within the region is available for delivery to the different region, and the at least one dedicated item is unavailable for delivery to the different region.

5. The computer-implemented method of claim 4, further comprising determining, in the at least one computing device, that a delivery location associated with a user is within the region.

6. The computer-implemented method of claim 5, further comprising identifying, in the at least one computing device, the at least one of the plurality of materials handling facilities based at least in part on the delivery location.

7. The computer-implemented method of claim 5, wherein the at least one of the plurality of materials handling facilities provides delivery to the delivery location through a local delivery system that operates only in the region.

8. The computer-implemented method of claim 7, wherein the local delivery system provides same-day delivery.

9. The computer-implemented method of claim 7, wherein the local delivery system provides next-day delivery.

10. The computer-implemented method of claim 4, wherein the region is a metropolitan area.

11. The computer-implemented method of claim 4, wherein the at least one item is discretely allocable to a customer and is unallocated to other customers.

12. The computer-implemented method of claim 4, further comprising sending the at least one network page to the client.

13. The computer-implemented method of claim 4, wherein the at least one network page offers for order the at least one item and the at least one dedicated item.

14. The computer-implemented method of claim 4, wherein the at least one network page is generated as part of a checkout workflow.

15. The computer-implemented method of claim 4, wherein the at least one dedicated item is perishable.

16. The computer-implemented method of claim 4, wherein the plurality of materials handling facilities are located within a geographic area, the region being located within the geographic area.

17. The computer-implemented method of claim 16, wherein the items of the global inventory are offered for standard shipment within the geographic area and within the different region.

18. The computer-implemented method of claim 4, wherein the at least one item is stored in a first materials handling facility and the at least one dedicated item is stored in a second materials handling facility.

19. The computer-implemented method of claim 4, wherein at least one of the at least one item or the at least one dedicated item surfaced in the at least one network page is unspecified in a request by a customer for the at least one network page.

20. A system comprising:

a data store that stores a representation of a global pool of items stored in a plurality of fulfillment centers; and at least one computing device in communication with the data store and configured to at least:

logic that determines a region associated with a client, wherein the region is determined based at least in part on a geolocation technology using an identifier associated with the client, or the region is determined based at least in part on a user-specified location associated with the client;

logic that identifies at least one of the plurality of fulfillment centers located within the region, wherein at least another one of the plurality of fulfillment centers is located within a different region;

logic that identifies a subset of the global pool of items that is stored in the at least one of the plurality of fulfillment centers within the region;

logic that generates at least one network page that surfaces at least one item included in the subset of the global pool of items stored in the at least one of the plurality of fulfillment centers within the region in association with at least one dedicated item stored in the at least one of the plurality of fulfillment centers within the region, the at least one dedicated item being dedicated for delivery within the region;

logic that sends the at least one network page to the client; and wherein the subset of the global pool of items that is stored in the at least one of the plurality of fulfillment centers within the region is available for delivery to the different region, and the at least one dedicated item is unavailable for delivery to the different region.

21. The system of claim 20, wherein the at least one computing device is further configured to at least:

logic that obtains an order for at least one item of the global pool of items from a client, the order specifying a selection of same-day delivery for the at least one item; and logic that generates a manifest including the at least one item for fulfillment at the at least one of the plurality of fulfillment centers.

22. A non-transitory computer readable medium including an electronic commerce application executable by at least one computing device, wherein when executed the electronic commerce application causes the at least one computing device to at least:

provide data representing a global inventory of items stored in a plurality of materials handling facilities;

determine a region associated with a client, wherein at least one of the plurality of materials handling facilities is located within the region and at least another one of the plurality of materials handling facilities is located within a different region, the region being determined based at least in part on a geolocation technology using an identifier associated with the client, or the region being determined based at least in part on a user-specified location associated with the client;

identify a portion of the global inventory that is stored in the at least one of the plurality of materials handling facilities located within the region;

generate at least one network page that includes a description of at least one item included in the portion of the global inventory that is stored in the at least one of the plurality of materials handling facilities located within the region and a description of at least one dedicated item stored in the at least one of the plurality of materials handling facilities located within the region, the at least one dedicated item being dedicated for delivery within the region;

send the at least one network page to the client; and wherein the portion of the global inventory that is stored in the at least one of the plurality of materials handling facilities located within the region is available for delivery to the different region, and the at least one dedicated item is unavailable for delivery to the different region.

\* \* \* \* \*